US006379099B1

(12) United States Patent
Novak

(10) Patent No.: US 6,379,099 B1
(45) Date of Patent: Apr. 30, 2002

(54) TRASH CONTAINER LIFT ASSIST

(76) Inventor: Michael Novak, 2425 Communication Pkwy. Apartment #613, Plano, TX (US) 75093

( * ) Notice: Subject to any disclaimer, the term of this patent is extended or adjusted under 35 U.S.C. 154(b) by 0 days.

(21) Appl. No.: 09/616,326

(22) Filed: Jul. 15, 2000

(51) Int. Cl.[7] ............................ B65F 5/00; B65G 65/23
(52) U.S. Cl. ........................ 414/421; 414/404; 414/419
(58) Field of Search ................................ 414/303, 406, 414/419, 421, 404

(56) References Cited

U.S. PATENT DOCUMENTS

| | | | | |
|---|---|---|---|---|
| 503,685 | A | | 8/1893 | Ryder |
| 540,530 | A | | 6/1895 | Willson |
| 731,442 | A | | 6/1903 | Elliot |
| 2,133,474 | A | * | 10/1938 | Roscoe ................... 414/421 X |
| 2,683,544 | A | | 7/1954 | Linde |
| 2,763,386 | A | | 9/1956 | Linde |
| 3,057,498 | A | | 10/1962 | Wheat |
| 3,063,082 | A | | 11/1962 | Rosenberg |
| 3,294,266 | A | | 12/1966 | Snow |
| 3,469,709 | A | | 9/1969 | Wood |
| 3,658,383 | A | | 4/1972 | Sisson |
| 3,738,516 | A | | 6/1973 | Wells |
| 3,750,810 | A | | 8/1973 | Stanfill |
| 4,102,462 | A | | 7/1978 | Beach et al. |
| 4,422,814 | A | | 12/1983 | Borders |
| 4,536,033 | A | | 8/1985 | Allen |
| 4,575,302 | A | | 3/1986 | Holden |
| 4,580,940 | A | | 4/1986 | Sheaves |
| 4,687,405 | A | | 8/1987 | Olney |
| 5,148,975 | A | | 9/1992 | Dickerson et al. |
| 5,207,550 | A | | 5/1993 | Lehman |
| 5,425,613 | A | | 6/1995 | Osborn |
| 5,527,009 | A | | 6/1996 | Allen |
| 5,586,692 | A | | 12/1996 | Livengood |

FOREIGN PATENT DOCUMENTS

| | | | | |
|---|---|---|---|---|
| AU | 143769 | * | 10/1951 | ................. 414/421 |
| DE | 479590 | * | 6/1929 | ................. 414/404 |
| DE | 2253602 | * | 5/1974 | ................. 414/421 |
| SU | 1518256 | * | 10/1989 | ................. 414/419 |

* cited by examiner

*Primary Examiner*—Steven A. Bratlie
(74) *Attorney, Agent, or Firm*—Kilpatrick Stockton LLP

(57) ABSTRACT

A manually operated lifting and rotating apparatus attached to a garbage dumpster for supporting and positioning a waste collection container for waste material transfer to a dumpster. The lifting and rotating apparatus comprises a bracing member including a pair of legs, with each of the legs including a bracket having a hole formed therein. Each of the legs further has a releasable clamp adapted for frictional engagement over an upper edge of a garbage dumpster to prevent displacement of the bracing member adjacent to the side of a dumpster. An angular displacement structure, pivotally joined to the bracing member, includes a pair of arms each having a first end opposite a second end, there being a support platform connected between the first ends of the arms, each of the second ends having an orifice formed therein. Pivotal joining of the angular displacement member to the bracing member uses a pivot bar inserted through each the hole in the legs and each the orifice at the second end of the pair of arms such that the angular displacement structure pivots relative to the bracing member and a side of a garbage dumpster during manual application of force to raise and rotate a waste collection container, on the platform, sufficient to discharge waste material into the dumpster.

4 Claims, 3 Drawing Sheets

TRASH CONTAINER LIFT ASSIST

TECHNICAL FIELD

The present invention relates generally to manually operated equipment for facilitating transfer of waste material from a waste collection container into a garbage dumpster. More specifically, the invention relates to a container lifting and pivoting apparatus that may be permanently or removably mounted in a position adjacent to, or against a side of a conventionally designed garbage dumpster for facilitating the dumping of material from a waste container such as a garbage can or barrel into the dumpster.

BACKGROUND ART

Waste material is a normal by-product of most manufacturing operations. In some business operations, the collection and removal of waste material represents a frequent activity in which smaller containers are used for initial collection of waste, followed by periodic transfers of the collected material to larger receiving dumpsters. These dumpsters are normally located outside the indoor facility and are designed for large quantity collection, retention, and periodic emptying into traveling garbage trucks. In another respect, food service and preparation businesses, such as restaurants, normally generate a significant amount of organic waste that deteriorates rapidly and requires removal before it presents a health hazard or malodor nuisance.

Restaurant facilities often have a special problem which involves transferring accumulated waste from portable kitchen area trash cans or barrel-type receptacles to larger containers such as traditional garbage dumpsters that are usually located in an enclosure at a prescribed distance outside of the restaurant building. Kitchen waste usually includes a combination of liquid and solid matter. As intimated above, an organic component stems from food waste generated during preparation of menu selections and discarded food not consumed by the restaurant's patrons. Solid non-food waste is generated from packaging, napkins and other discarded items incident to restaurant and dining activities. At the indoor collection point, this combination of waste material settles and packs densely into portable collection containers that may hold volumes measuring as much as fifty or more gallons. Such containers, when full, may weigh in excess of three hundred pounds. Movement by personnel of full containers, without proper assistance, can lead to personal injury.

Movement of waste in the portable collection containers from within a restaurant to the outdoor garbage dumpsters may be facilitated using wheeled containers or by placing the containers on maneuverable carts. At several times during the daily hours of operation, restaurant staff moves filled collection containers to transfer the accumulated waste to a large outdoor garbage dumpster. Typically, a full collection container such as a trash can requires lifting and tipping to empty the collected waste from the open top mouth of the container. The height of the garbage receiving opening into the dumpster usually requires the person lifting the full collection container to raise the container to a position significantly above the ground before tipping the can to empty the waste material into the dumpster. As indicated previously, the weight of a filled collection container is likely to be greater than the average person can safely and controllably lift from a resting position on the ground. Raising a full container up to a height sufficient to empty the contents into the dumpster, therefore, represents a potentially hazardous maneuver.

A common aid utilized in lifting and emptying waste collection containers relates to power assisted mechanisms that use a hook or similar means for connecting to a container specially constructed to receive such a hook. This construction, however, necessarily requires that the containers be specially adapted to be matingly engaged by such power systems. This is negatively viewed by most business owners who desire to use their conventional collection cans that they already have and are not interested in having to have specially configured and more expensive collection containers that may be are only obtainable from limited sources.

U.S. Pat. No. 4,422,814 discloses an hydraulic assist mechanism to raise, tip and empty waste from a full collection container into a garbage dumpster. The power mechanism is permanently bolted to the dumpster and requires mating engagement between features of the lifting mechanism and a specially designed waste collection container. U.S. Pat. No. 4,575,302 also discloses a relatively complex structure, with hydraulic assist, that empties material out of a collection container. In this patent, the container is either part of the structure or needs to be specially designed for attachment to the structure. The hydraulically operated lift and tip apparatus of U.S. Pat. No. 4,580,940 has a similar requirement for a specially adapted waste collection container, but in this example, lifting handles or similar structure are also strategically included in the combination.

It should be appreciated that each of the patents discussed above employ power assisted hydraulic cylinders for powering connective mechanisms. U.S. Pat. No. 3,738,516 describes similar motorized equipment for inverting a portable container for emptying waste therefrom and into a larger garbage bin. Though free from hydraulic power assist, this equipment, like the others above are functional only with specially designed containers.

The cost of the powered lift-assist equipment described above is often prohibitively expensive for restaurants and other businesses which have a regular need for lifting and emptying waste containers that weigh three hundred pounds or more. As a result, most businesses, and especially restaurants, rely on manual dumping of waste containers or cans into dumpsters. These activities, however, are not risk-free; there is the potential for persons performing these activities to suffer disabling injuries that carry with them associated personal and monetary costs. These problems have revealed the need for low cost, lift and tip assist equipment that allows safe manual transfer of waste from collection containers to larger sized garbage dumpsters. Furthermore, in view of the above described deficiencies associated with the use of known designs for transferring the contents of heavy containers of waste using conventional lift-assist equipment, the present invention has been developed as an improvement thereto. These enhancements and benefits are described in greater detail hereinbelow with respect to several alternative embodiments of the present invention.

DISCLOSURE OF THE INVENTION

A manually operated lifting and rotating apparatus according to the present invention provides a removably mountable two part system including a bracing member and an angular displacement structure adapted to pivot relative to the bracing member. The bracing member includes a releasable clamp to prevent displacement of the member adjacent to the side of a dumpster. A bracing member includes legs optionally adapted to adjust to the height of the dumpster to provide stability during pivotal movement of the angular displacement structure. The angular displacement structure includes arms that may be adjustable, a folding platform and optionally bar extensions that may be grasped for additional leverage or by multiple personnel. With the folding platform extended, a waste collection container of substantially any design may be supported on the platform and secured to the angular displacement structure using repositionable restraints. The angular displacement structure bears the weight of the waste container so that the manual effort of emptying a container can be focused on raising the container into a position for tipping the waste into the garbage dumpster. Adjustment of the height of the platform may be required before pivotal movement of the displacement structure so that the mouth of the waste collection container is at least level with the upper edge of the garbage dumpster. As the longitudinal axis of the container reaches horizontal, waste material will begin to discharge into the garbage dumpster from the waste collection container. This lightens the container to facilitate continuing pivotal rotation of the container towards an inverted position to achieve substantially complete emptying of the contents of the container. As a safety feature, suitable measures may be employed to prevent unintended falling of the container or its contents during the emptying process. An exemplary solution would be the inclusion of a ratchet device at the pivot mechanism that ratchets up as the trash container is rotated from the essentially upright position to the tilted and emptying position. As a result, the lifting arrangement can not move backward toward the original position until specifically enabled by the operator. Such ratchet systems and their details are well known to those skilled in these arts, and is therefore not described in detail. Similarly, a ratcheted pulley system may be utilized in the pivoting process which achieves the same goal; only lifting action is enabled until the operator purposely disengages the ratchet feature allowing the lifting assembly and trash container to be lowered to the initial position.

More particularly, the invention provides a manually operated lifting and rotating apparatus permanently or removably attached to a garbage dumpster for supporting and positioning a waste collection container for waste material transfer to a dumpster. The lifting and rotating apparatus comprises a bracing member including a pair of legs, with each of the legs including a bracket having a hole formed therein. Each of the legs further has a releasable clamp adapted for frictional engagement over an upper edge of a garbage dumpster to prevent displacement of the bracing member adjacent to the side of a dumpster. An angular displacement structure, pivotally joined to the bracing member, includes a pair of arms each having a first end opposite a second end, there being a support platform connected between the first ends of the arms, each of the second ends having an orifice formed therein. Pivotal joining of the angular displacement member to the bracing member uses a pivot bar inserted through each the hole in the legs and each the orifice at the second end of the pair of arms such that the angular displacement structure pivots relative to the bracing member and a side of a garbage dumpster during manual application of force to raise and rotate a waste collection container, on the platform, sufficient to discharge waste material into the dumpster.

The beneficial effects described above apply generally to the exemplary devices and mechanisms disclosed herein for equipment useful for manually raising waste collection containers to empty their contents into garbage dumpsters. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein;

however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
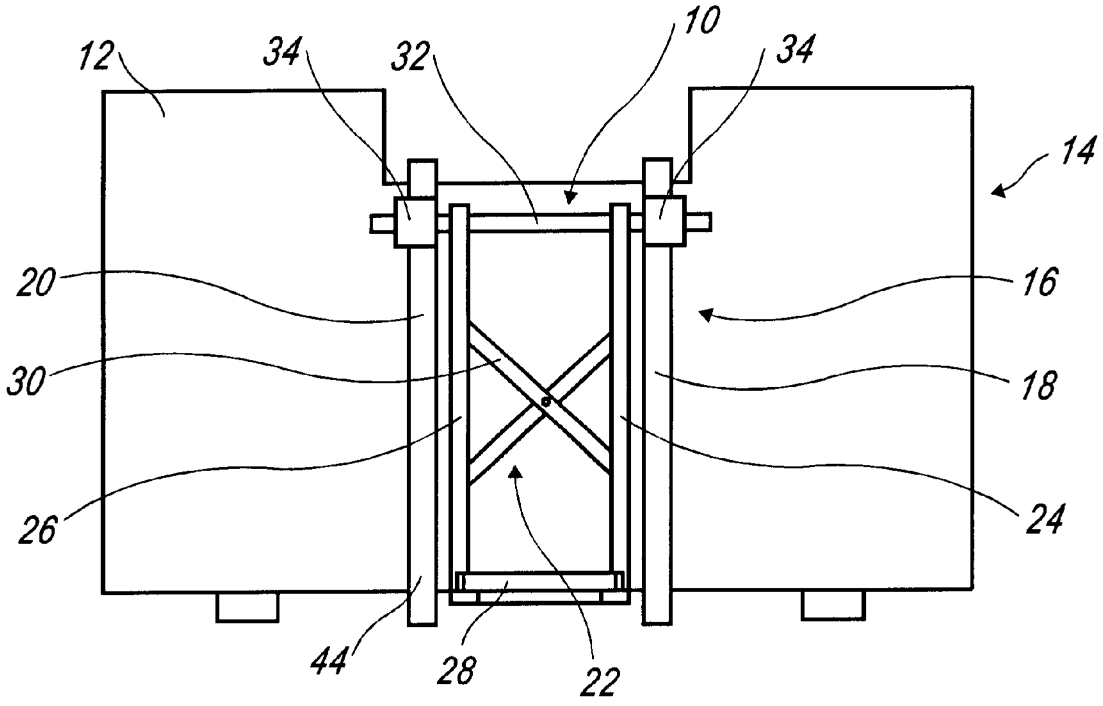
FIG. 1 is a front elevational view showing a manually operated lifting and rotating apparatus according to the present invention including a bracing member having an angular displacement structure suspended therefrom.

Referring now to the drawings wherein like numbers represent like parts throughout the several views, FIG. 1 is a front elevational view showing an apparatus 10 constructed and operated according to the present invention attached to a sidewall 12 of a garbage dumpster 14. The apparatus 10 allows manual lifting and rotation of a full waste collection container to empty its contents into the garbage dumpster 14. Acting as a support for heavy waste collection containers weighing up to 300 pounds, the apparatus 10 facilitates discharge of a container's contents into a dumpster 14 and thereby reduces the possibility of injury to those persons moving and emptying heavy containers.

The apparatus 10 includes a bracing member 16 illustrated herein to include a first leg 18 and a second leg 20 positioned on either side of an angular displacement structure 22 that rotates relative to the bracing member 16 during lifting and discharge of waste collection containers. The angular displacement structure 22 includes a first arm 24 and a second arm 26 and has a platform 28 for supporting containers that require emptying. One or more reinforcing bands 30, or similar forms of reinforcement, may be included with the angular displacement structure 22 to add rigidity to the structure 22. Pivotal coupling of the angular displacement structure 22 to the bracing member 16 uses a pivot bar 32 as may be seen in FIG. 1. The pivot bar 32 represents one means for producing a structure of essentially two parts with one part, in this case the angular displacement structure 22 adapted to rotate relative to the other part; i.e. the bracing member 16. Other methods for providing rotational movement between parts will be apparent to those having skill in the art and fall within the scope of the present invention. Such other mechanisms and methods include ball and socket arrangements, hinged structures and multiple-pivot structures, each of which are well known to those skilled in the art and recognized as equivalents to the described structure.

Preferably, the apparatus 10 according to the present invention attaches, either permanently or removeably, but always securely, to the sidewall of a dumpster with the length of the legs suitably adjusted to match the height between the ground and the edge of the dumpster 14 exemplarily shown as engaging releasable clamp portions (see FIG. 3 and FIG. 4) of the legs. The length of the arms 24,26 of the angular displacement structure 22 places the platform 28 clear of the ground to allow free movement of the angular structure 22 about the pivot bar 32.

Figure 2:
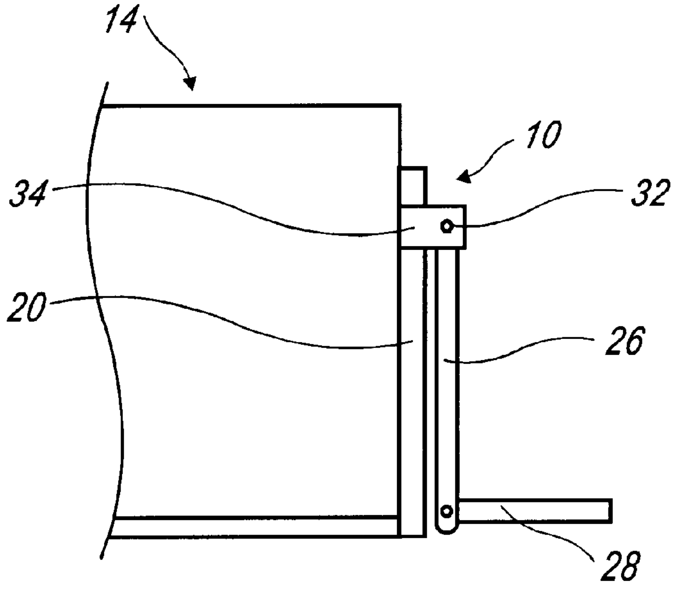
FIG. 2 is a side elevational view showing the position of a manually operated lifting and rotating apparatus according to the present invention adjacent to a side of a garbage dumpster.

FIG. 2 provides a side elevational view of the apparatus 10 showing how a side bracket 34 on each of the legs 18,20 of the bracing member 14 couples to the pivot bar 32 and also to the angular displacement structure 22. Retention of the pivot bar 32 in the side brackets 34 may use a variety of restrictor devices to prevent lateral movement of the pivot bar. Such restrictor devices include collars positioned around the ends of the pivot bar 32 and secured against the bar 32 using set screws or other means for locking a collar against an end of a pivot bar 32.

The platform 28, as shown in FIGS. 1 and 2, extends horizontally between the arms 24,26 of the angular displacement structure 22. Preferably, connection of the platform to the arms 24,26 of the angular displacement structure 22 allows the platform 28 to fold up and between the arms 24,26 when not in use. The coupling connection between the arms 24,26 and the platform 28 may take the form of hinges at each side of the platform 28 or the platform 28 may be adapted to rotate about an axle extending between the first arm 24 and the second arm 26.

Figure 3:
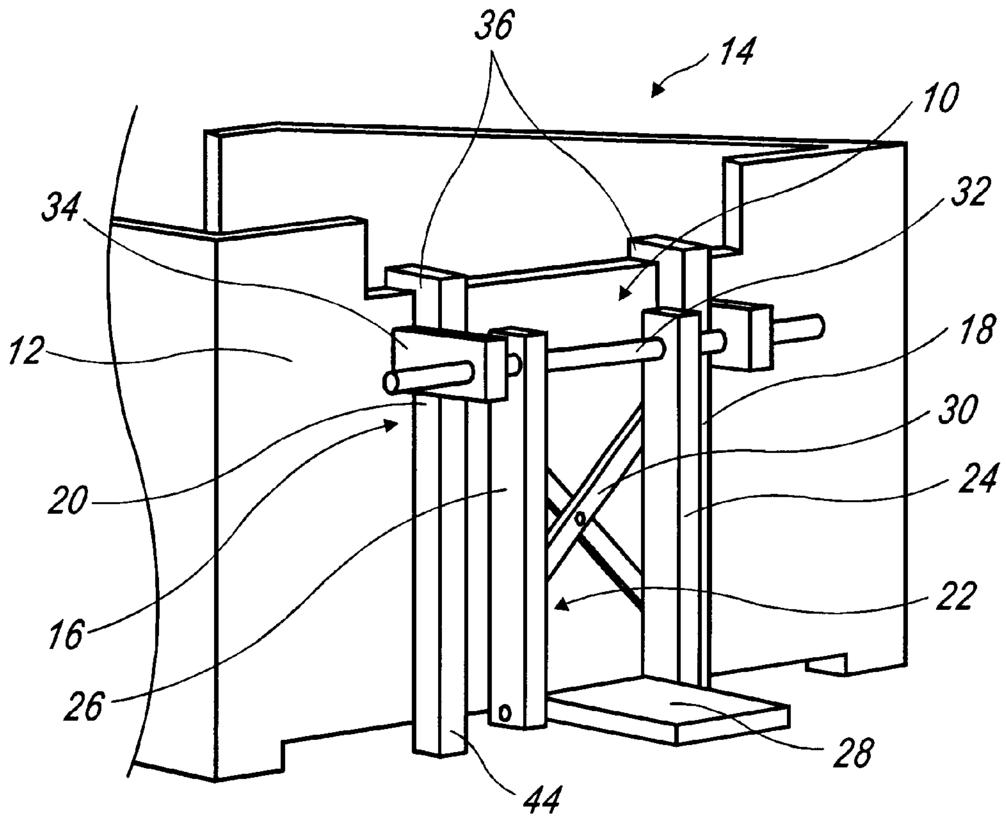
FIG. 3 is a perspective view of a manually operated lifting and rotating apparatus constructed according to the present invention.
Figure 4:
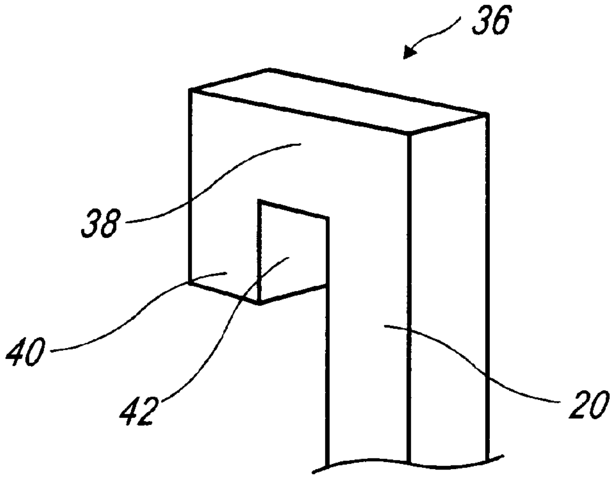
FIG. 4 provides a perspective view of a releasable hook or clamp used to prevent displacement of a bracing member, according to the present invention, with respect to the side of a dumpster.

FIG. 3 provides a perspective view of a lifting and rotating apparatus 10 according to the present invention showing more detail of the releasable clamp portions 36 of the first leg 18 and the second leg 20 as well as their position relative to the sidewall 12 of a garbage dumpster 14. As shown in FIG. 4, the releasable clamp portions 36 of the legs 18,20 of the bracing member 16 have an orthogonal structure intended to provide firm contact between the hooks 36 and the rectangular upper edge of the sidewall 12 of the garbage dumpster 14. The gripping force associated with the releasable clamps 36 may be increased by including a friction pad, such as a rubber pad between a releasable clamp 36 and the sidewall 12. Alternatively, a releasable clamp 36 may be lined with such a friction material or the releasable clamp 36 or leg 18,20 may be constructed from a resilient material that exerts a gripping force against the sidewall 12 of the garbage dumpster 14. Selection of such a resilient material also requires a material to hold the bracing member 16 against the sidewall 12 substantially limiting movement during lifting and rotating of the angular displacement structure 22 to empty a waste collection container.

FIG. 4 provides additional detail of the a releasable clamp 36 used to attach a leg 18,20 of the bracing member 16 to the sidewall 12 of a garbage dumpster 14. The releasable clamp 36 includes a cross bar 38 integrally attached at 90° to the leg 18,20 or at an angle that substantially matches the contour of the upper edge of the sidewall 12. A downward extension 40 integrally formed with the cross bar 38. The distance between the inner surface of the leg 18,20 and the inner surface 42 of the downward extension is preferably just slightly greater than the lip of the dumpster 14 over which the clamp 36 or hook must extend. This provides a close fit of the releasable clamp 36 over the edge of the sidewall 12, with optional use of either a friction pad directly bonded to the releasable clamp 36 or positioned between the tip and the sidewall 12. As indicated previously, the internal contour of a releasable clamp 36 matches the contour of the upper edge or lip of the side wall 12 to provide relatively secure, releasable connection between the two. When the releasable clamps 36 of each leg 18,20 are correctly positioned, each leg end 44 preferably makes contact with the ground to stabilize the bracing member 16, holding it substantially immobile relative to the sidewall 12 of the garbage dumpster.

While the configurations illustrated in FIGS. 3 and 4 specifically show a releasable connection between the lift assist 10 and the dumpster 14, a permanent connection maybe similarly used and should be considered to be within the scope of the claimed invention. Such permanent connections may include direct welding, integral construction and other means readily contemplated by those skilled in these arts.

Figure 5:
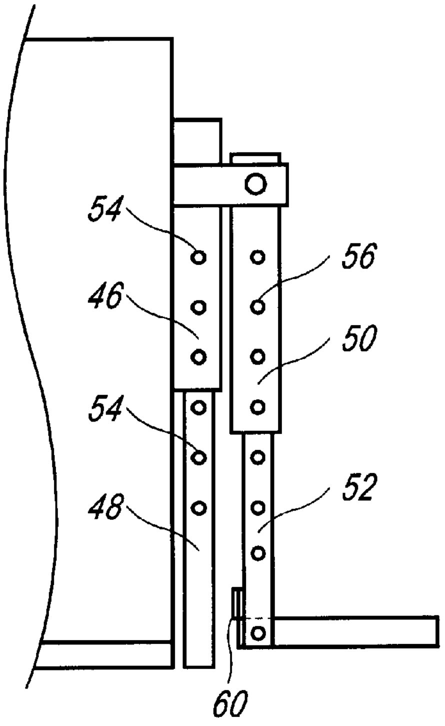
FIG. 5 is side elevational view similar to that of FIG. 2 except that the length adjustable features have been added to the legs and arms of the manually operated lifting and rotating apparatus.

Often garbage dumpsters may be unloaded from garbage trucks on to uneven ground. This suggests that the a fixed length of a leg 18,20 of a bracing member 16 may at times fail to reach a depressed surface of the ground adjacent to the sidewall 12 of a garbage dumpster 14. Safe use of the apparatus 10 according to the present invention requires adaptation of the bracing member 16 to make it essentially immobile while emptying a heavy waste collection container. FIG. 5 shows one of the legs 18,20 of the bracing member 16 with the leg 18 including a sleeve 46 and a sliding support 48 to allow adjustment of the length of a leg 18,20 so that a leg end 44 may make solid contact with the ground even though the garbage dumpster 14 may be resting on uneven ground.

A similarly adjustable angular displacement structure 22 allows use of waste collection containers of differing heights with the apparatus 10 according to the present invention. The ability to lower and raise the platform 28 places the mouth of a waste collection container at a suitably elevated position, substantially level with the edge of the garbage dumpster 14 so that the contents of a container will discharge into the inner cavity of a garbage dumpster 14 without significant spillage down the outer surface of the sidewall 12. Adjustment of the height of the angular displacement structure, as shown in FIG. 5 and FIG. 6, uses two part arms 24,26 including an elongate housing 50 and a sliding rail 52 for each arm.

Figure 6:
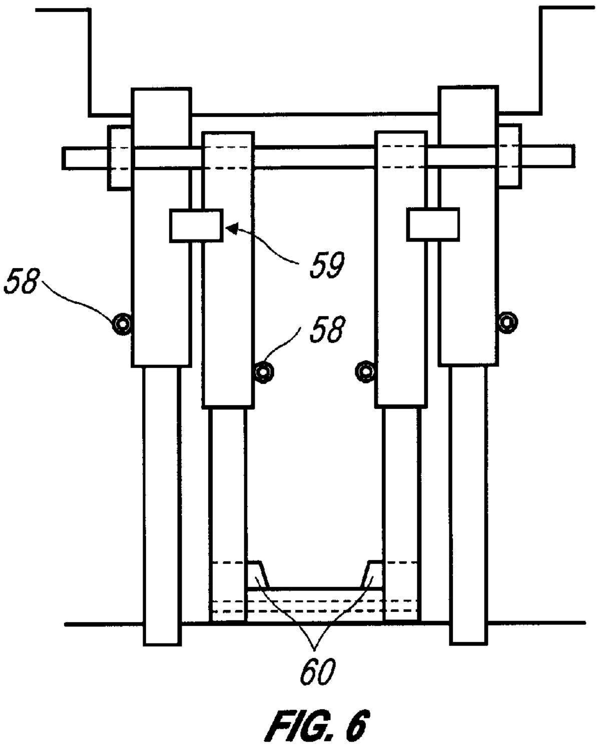
FIG. 6 is a front elevational view of the lifting and rotating apparatus with details of the adjustable structure of the legs of the bracing member and the arms of the angular displacement structure shown.

As shown in FIG. 5 and FIG. 6, the adjustment of either of the legs 18,20 or the arms 24,26 involves moving a sliding support 48 or sliding rail 52 into a position in the sleeve 46 or elongate housing 50 producing desired alignment between leg throughholes 54 or arm through-orifices 56, with adjustment of the legs 18,20 or arms 24,26 to the correct heights. Locking pins 58 may be inserted in the through-holes 54 or through orifices 56 for height retention. It will be appreciated that other structures and methods may be used for adjusting the length dimension of either the legs 18,20 or arms 24,28 without departing from the scope of the present invention. Rack and pinion and ratchet mechanisms are well known for linear adjustment of multi-section support structures and as such apply to the present invention. Also devices such as hooks, clamps and other known securing means may replace locking pins 58 for setting the position of a sliding support 48 relative to a sleeve 46 and for holding the position of a sliding rail 52 relative to an elongate housing 50.

FIG. 5 and FIG. 6 also include a stop 60 attached to the rear edge of the platform 28 to limit motion of the platform 28 as it is moved from a closed to an open orientation. Preferably, in its open position, the platform 28 forms an angle of 90° with the front surfaces of the arms 24,26 of the angular displacement structure 22. This angular positioning results from contact of the stops 60 with the rear surface of each arm 24,26. The stops 60 are strong enough to sustain, without breaking, the maximum weight resting on the platform 28.

Figure 7:
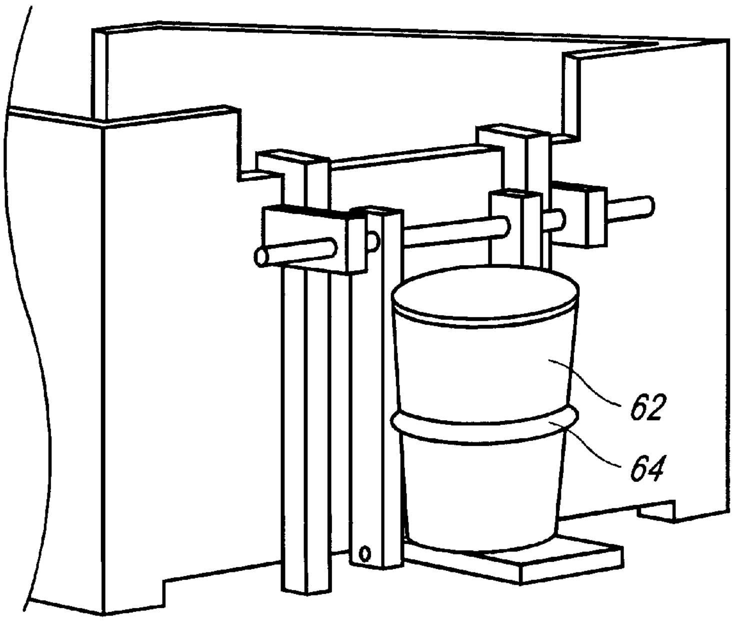
FIG. 7 illustrates a waste collection container supported on a platform and secured to the angular displacement structure using resilient restraints.

FIG. 7 shows a lifting and rotating apparatus 10 as previously described with a waste collecting container 62 placed on the platform 28 of the angular displacement structure 22. In this position, the apparatus 10 bears the weight of the container 62 allowing disposal personnel to lift and rotate the container away from the sidewall 12 of the garbage dumpster 14 to a position above the edge of the garbage dumpster 14 such that the container 62 becomes inverted for discharging the container contents into the garbage dumpster 14. Safe operation of the lifting and rotating apparatus 10, especially with containers weighing in excess of 100 lbs. may require cooperation of two or more persons. For this reason, the arms 24,26 of the angular displacement structure 22 may include leverage bars or handles that may be grasped by several people to aid raising and rotating the container 62. Assist devices may also be deployed from the platform 28 providing it is suitably secured before any attempt is made to empty a container.

The waste collection containers 62 used on the lift assist 10 may require some form of restraint to hold it against the angular displacement structure 22 during lifting and rotation. FIG. 7 shows a flexible band 64 encircling the waste collection container 62. The flexible band 64 is preferably adapted to attach to the angular displacement structure 22 to provide the desired restraint. Suitable restraints 64 include belts, ropes, bungee cords and fiber or filament reinforced ropes or cords or tapes optionally including fasteners such as buckles, hooks, and clamps and the like.

The apparatus 10, as depicted herein, is constructed using square cross-sectional tubular made of metal or other suitable structural material. While sections of box-beam represent the preferred construction material, it is possible to use other structural elements including cylindrical tubular members and beams having alternative cross sectional shapes. Also, the specific design of a bracing member 16 and an angular displacement member 22 may be varied including changes in the structure of reinforcing bands 30 or similar structural reinforcements. It is conceivable that more than two legs 18,20 could be included in the bracing member 16 and more than two arms may comprise an angular displacement structure 22. Further a manually operable pulley or lever system may be adapted for lifting and rotating a full waste collection container thereby reducing the amount of physical effort expended by disposal personnel during operation of the apparatus 10.

In the interest of safety, an anti-recoil device such as a ratchet mechanism 59, shown schematically in FIG. 6, may be employed to prevent unintended counter-rotation of a heavy trash container 62 during the lifting process. A properly configured ratchet mechanism 59, or suitable substitute therefore, reduces the likelihood of a person being hurt because a loaded trash can, together with the lift assembly, has swung back toward the resting position after being partially lifted, or before otherwise intended by the operators. Using a ratchet of conventional design, the trash container can be progressively lifted, and if adjustments need to be made, such as changing a hand-hold, the lift assist assembly 10 will hold the can at the position to which it has been lifted, and accommodate further progress to the fully lifted position when lifting action is resumed. Still further, the ratchet 59 will hold the assembly 10 in the raised position until intentionally reconfigured to permit recoil back to the upright position. As intimated above, a ratcheted pulley system may also be advantageously employed for providing similar safety benefits, as well as providing mechanical assistance to the lifting process.

A waste container lifting and rotating apparatus and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A manually operated lifting and rotating apparatus attached to a garbage dumpster for supporting and positioning a waste collection container for waste material transfer to a dumpster, said lifting and rotating apparatus comprising:

a bracing member including a pair of legs, each of said legs including a bracket having a hole formed therein, each of said legs further having a releasable clamp adapted for frictional engagement over an upper edge of a garbage dumpster to prevent displacement of said bracing member adjacent to the side of a dumpster;

each of said legs including upper and lower telescopically arranged portions variously configurable for accommodating leg-length adjustment; an angular displacement structure including a pair of arms each having a first end opposite a second end, there being a support platform connected between said first ends of said arms, each of said second ends having an orifice formed therein; and a pivot bar inserted through each said hole in said legs and each said orifice at said second end of said pair of arms such that said angular displacement structure pivots relative to said bracing member and a side of a garbage dumpster during manual application of force to raise and rotate a waste collection container on said platform sufficient to discharge waste material into the dumpster.

2. The manually operated lifting and rotating apparatus of claim 1 further comprising:

each of said telescopically arranged leg portion including leg-through alignable holes for fixing leg-length; and a locking pin configured for insertion across a pair of aligned leg-through holes.

3. The manually operated lifting and rotating apparatus of claim 1 further comprising:

each of said arms including upper and lower telescopically arranged portions variously configurable for accommodating arm-length adjustment.

4. The manually operated lifting and rotating apparatus of claim 3 further comprising:

each of said telescopically arranged arm portion including arm-through alignable orifices for fixing arm-length; and a locking pin configured for insertion across a pair of aligned arm-through orifices.

* * * * *